April 19, 1960 R. P. JOHNSON 2,933,689

GATED AMPLITUDE DISCRIMINATOR

Filed April 4, 1958

R. P. Johnson
INVENTOR.

BY [signature]
ATTORNEY

United States Patent Office 2,933,689

Patented Apr. 19, 1960

2,933,689

GATED AMPLITUDE DISCRIMINATOR

Robert P. Johnson, Burbank, Calif., assignor to Bendix Aviation Corporation, North Hollywood, Calif., a corporation of Delaware Application April 4, 1958, Serial No. 726,558

4 Claims. (Cl. 328—146)

This invention relates to circuits for discriminating between potential amplitudes respectively above and below a reference level, as by producing output potentials of one polarity in response to input potentials above the reference level, and output potentials of the other polarity in response to input potentials below the reference level. More particularly, it relates to such circuits in which the input potential is momentarily sampled at intervals to produce positive or negative output pulses indicative of the direction and extent of departure of the input potential from the reference level.

An object of the invention is to provide a particularly simple, inexpensive and reliable circuit for accomplishing the above functions.

Other objects are to provide such a circuit that: (1) requires only one three-electrode tube or equivalent amplifying device, such as a transistor; (2) requires no balanced or precision parts; (3) requires no reference potential source; and (4) has low power consumption compared with previously used circuits.

Other specific objects and features of the invention will become apparent from the description to follow:

The essence of the present invention is a vacuum tube or equivalent amplifier having a dual value cathode-biasing resistance system and an input gate, both of which are responsive to a gating pulse to simultaneously apply the input potential to the amplifier input and increase the biasing resistance from a fixed low to a fixed high value, such that an input potential of reference value produces no change in the amplifier output, an input potential above the reference value produces a change in the amplifier output in one direction, and an input potential below the reference value produces a change in the amplifier output in the other direction.

A full understanding of the invention may be had from the following detailed description with reference to the drawing, in which.

Figure 1:
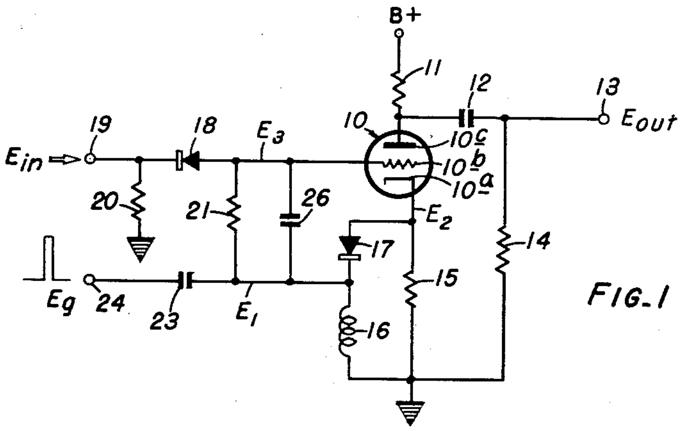
Fig. 1 is a schematic diagram of a circuit incorporating the invention.

As shown in Fig. 1, the amplifier consists of a triode vacuum tube 10 having the usual cathode 10*a*, grid 10*b*, and plate 10*c*. The plate 10*c* is connected through a conventional coupling impedance 11 to a B+ terminal of a power supply and through a capacitor 12 to an output terminal 13, the latter also being connected through a stabilizing resistor 14 to ground.

Cathode 10*a* is connected to ground through a biasing resistance means consisting of a resistor 15 connected directly between the cathode and ground, and a conductive impedance element 16 connected in series with a diode 17 between cathode and ground. The diode 17 is poled to conduct the normal cathode current. The element 16 is a reactor having substantial impedance to rapidly changing pulses, but having a relatively low resistance to direct current.

The grid 10*b* is connected through a diode 18 to an input terminal 19 which is connected to ground through a relatively low resistance. This resistance may be provided by a resistor 20 in the discriminator circuit, or it may be constituted by the internal resistance of a source of input potential that is connected to the input terminal 19. The grid 10*b* is connected through a resistor 21 to the circuit junction between the diode 17 and the reactor 16, and the resistor 21 functions to maintain the grid 10*b* at the same potential as the junction under normal conditions. The junction of the diode 17 and the reactor 16 is also connected through a capacitor 23 to a gating terminal 24.

In operation, a positive input potential $E_g$ is applied to the gating terminal 24 at intervals. The gating pulses $E_g$ have the same polarity but are of substantially greater magnitude than the greatest input potential $E_{in}$.

Figure 2:
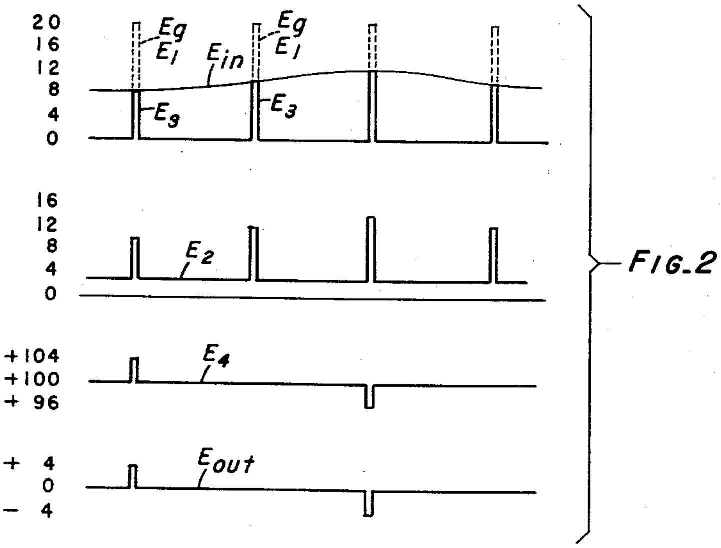
Fig. 2 is a series of graphs illustrating the operation of the system.

In the absence of a gating pulse $E_g$, the plate potential $E_4$ is constant and has a reference value largely determined by the small cathode bias provided by the resistance of the diode 17 in the conductive direction, which resistance is small compared to that of the resistance element 15. In Fig. 2, this plate potential $E_4$ is shown as having a steady state value of 100 volts, and the output voltage $E_{out}$ is, of course, zero.

Application of a gating pulse $E_g$ renders the diode 17 nonconductive (as the reactor 16 offers a high impedance to the pulse), so that for the duration of the pulse the cathode bias is determined by the resistance element 15. The gate pulse is also applied through resistor 21 to the grid and raises the potential of the grid to the input potential $E_{in}$, further rise being prevented by conduction through the diode 18 and the resistor 20 to ground. The gating pulse therefore drives the grid more positive, tending to lower the plate potential in proportion to the increase in grid potential. However, the gating pulse simultaneously increases the biasing resistance means to the higher value of the resistance element 15, tending to increase the plate potential. A value for resistance element 15 is selected such that for a potential $E_{in}$ of the reference value, the plate potential is the same as that existing when there is no gating pulse. Obviously, therefore, if the input potential is above or below the reference value determined by the resistance element 15, the gating pulse reduces or raises the plate potential to deliver a negative or a positive pulse through the capacitor 12 to the output terminal 13.

Referring to Fig. 2, the graphs therein show an arbitrary situation for the duration of four gating pulses $E_g$. The input potential $E_{in}$ is shown as varying slowly from a value of 8 volts at the time of the first pulse to the arbitrary reference value of 10 volts at the time of the second pulse, to a value of 12 volts at the time of the third pulse, and back to 10 volts at the time of the fourth pulse. The value of the gating pulse $E_g$ and the pulse $E_1$ applied to the junction of the diode 17 and the reactor 16 is indicated as 20 volts. However, the potential $E_3$ applied to the grid does not exceed the input potential $E_{in}$.

The potential $E_2$ at the cathode of the tube is approximately 3 volts when no pulses are received, because of the low resistance of the diode 17 in the conducting direction, and of the reactor 16. When the high potential $E_1$ is applied to the junction of diode 17 and reactor 16, it is prevented from being dissipated to ground by the reactor, and its full intensity is applied to the diode 17 in the back direction of the latter to render it nonconductive, so that the resistance element 15 is then the only path from the cathode to ground. The high value of the resistance element 15 positively biases the cathode a variable amount dependent upon the grid potential. Thus at the time of the first pulse, when the grid potential $E_3$ is 8 volts, the cathode potential $E_2$ rises to approximately 10½ volts, leaving a differential potential between the cathode and grid of 2½ volts which increases the potential $E_4$ of the plate from 100 to 104 volts and produces a 4-volt positive pulse $E_{out}$. At the time of the second pulse, when the input potential $E_{in}$ is 10 volts, the grid potential $E_3$ is 10 volts, and the cathode potential is 12 volts, leaving a differential potential of 2 volts between the cathode and grid which produces the normal plate potential of 100 volts so that no change in the plate voltage $E_4$ or in the output voltage $E_{out}$ is produced. At the time of the third pulse, when the input potential is 12 volts and the grid potential $E_3$ is the same, the cathode potential $E_2$ is 13½ volts, which produces a plate potential $E_4$ of 96 volts and a negative output pulse of 4 volts.

A capacitor 26 may be connected in shunt to the resistor 21 to permit rapid charging of the tube input capacitance in response to each gating pulse, thereby insuring close coincidence of grid and cathode waveforms.

The system is not limited to the use of vacuum tubes as distinct from other amplifying devices, such as transistors. It is sufficient that the amplifying device have an input electrode, an output electrode, and a common electrode, which in the case of the vacuum tube are constituted by the grid, plate and cathode, respectively.

Although for the purpose of explaining the invention a particular embodiment thereof has been shown and described, obvious modifications will occur to a person skilled in the art, and I do not desire to be limited to the exact details shown and described.

I claim:

1. A gated amplitude discriminator for discriminating between unidirectional input potentials of amplitudes respectively above and below a reference level, comprising in combination: an amplifier having input, output and common electrodes; a source of energizing potential; an output coupling impedance connecting one terminal of said source to said output electrode; biasing impedance means connecting the other terminal of said source to said common electrode; an input terminal for an input potential to be discriminated; gating means connecting said input terminal to said amplifier input electrode and being normally closed, and opening in response to application thereto of a gating potential; said biasing impedance means normally having a first fixed resistance value but being responsive to application of a gating potential thereto to increase its resistance to a second higher fixed resistance value; a gating terminal for a gating potential and means connecting said gating terminal to said gating means and to said biasing means, whereby application of a gating potential to said gating terminal simultaneously varies said biasing impedance means from said first to said second fixed resistance value and applies an input potential on said input terminal to said amplifier input electrode; the relative values of said first and second biasing resistance values being such that the output of said amplifier with said second bias resistance value and an input voltage of reference level is the same as the output with said first bias resistance value and no input voltage, whereby said output varies in one direction when said input potential is above said reference level and varies in the opposite direction when said input potential is below said reference level.

2. Apparatus according to claim 1 in which said gating means comprises a diode connecting said input terminal to said input electrode in blocking relation to said unidirectional input potential; high-impedance conductive means connecting said gating terminal to said input electrode; and low-impedance resistance means connecting said input terminal to said other terminal of said source whereby in response to application to said gating terminal of a gating potential exceeding an input potential, said diode conducts, and the potential applied to said input electrode is determined by said input potential.

3. Apparatus according to claim 1 in which said biasing means comprises a resistance element of said second resistance value connected between said other terminal of said source and said common electrode; a diode and a conductive impedance element connected in series with each other and in parallel with said resistance element; and means connecting said gating terminal to the junction of said diode and said impedance element; said diode being poled in conductive relation with respect to said source.

4. Apparatus according to claim 3 in which said impedance element is a reactance element.

References Cited in the file of this patent

UNITED STATES PATENTS

| | | |
|---|---|---|
| 2,496,909 | Eberhard | Feb. 7, 1950 |
| 2,683,806 | Moody | July 13, 1954 |
| 2,844,763 | Wyckoff | July 22, 1958 |